US011445380B2

(12) United States Patent
Bollapragada et al.

(10) Patent No.: US 11,445,380 B2
(45) Date of Patent: Sep. 13, 2022

(54) METHODS AND SYSTEMS OF AUTOMATIC NETWORK DEPLOYMENT DEVIATION DETECTION

(71) Applicant: Nile Global, Inc., Cupertino, CA (US)

(72) Inventors: Vijay Bollapragada, Bangalore (IN); Suresh Katukam, Milpitas, CA (US); Ganesh Sundaram, Santa Clara, CA (US)

(73) Assignee: Nile Global, Inc., San Jose, CA (US)

( * ) Notice: Subject to any disclaimer, the term of this patent is extended or adjusted under 35 U.S.C. 154(b) by 0 days.

(21) Appl. No.: 17/134,053

(22) Filed: Dec. 24, 2020

(65) Prior Publication Data

US 2022/0210664 A1 Jun. 30, 2022

(51) Int. Cl.
*H04W 16/18* (2009.01)
*H04L 41/14* (2022.01)
*H04L 41/12* (2022.01)
*H04W 24/02* (2009.01)

(52) U.S. Cl.
CPC ............. *H04W 16/18* (2013.01); *H04L 41/12* (2013.01); *H04L 41/145* (2013.01); *H04W 24/02* (2013.01)

(58) Field of Classification Search
CPC ...... H04W 16/18; H04W 24/02; H04L 41/145
USPC ........................................................ 709/220
See application file for complete search history.

(56) References Cited

U.S. PATENT DOCUMENTS

| 8,887,262 | B1 | 11/2014 | Turner et al. |
| 9,173,115 | B2 | 10/2015 | Sundareswaran et al. |
| 9,769,734 | B2 | 9/2017 | Goto |
| 2014/0278281 | A1 | 9/2014 | Vaynriber et al. |
| 2015/0172118 | A1 | 6/2015 | Lin |
| 2016/0352766 | A1* | 12/2016 | Flacher .................. H04L 67/10 |
| 2017/0318053 | A1* | 11/2017 | Singh .................. H04L 63/1425 |
| 2017/0374560 | A1 | 12/2017 | Judge et al. |
| 2018/0120973 | A1 | 5/2018 | Tiwari et al. |
| 2020/0322809 | A1* | 10/2020 | Zhao ..................... H04W 16/18 |

* cited by examiner

*Primary Examiner* — David R Lazaro
*Assistant Examiner* — Zia Khurshid
(74) *Attorney, Agent, or Firm* — Loza & Loza, LLP

(57) ABSTRACT

In an embodiment, a method of network deployment involves at a cloud server, determining a planned network design for a network to be deployed at a customer site, at the cloud server, receiving network device information and location information of a network device after the network device is deployed at the customer site, and at the cloud server, automatically performing network deployment deviation detection for the network device based on the planned network design and the network device information and the location information of the network device.

19 Claims, 11 Drawing Sheets

METHODS AND SYSTEMS OF AUTOMATIC NETWORK DEPLOYMENT DEVIATION DETECTION

BACKGROUND

Network deployment, for example, enterprise network deployment, at a customer site typically involves a manual and lengthy process, which can take several weeks to months. For example, network deployment typically involves multiple time consuming and error-prone steps, such as gathering requirements, network design, network implementation, network operation, and network optimization, which are manually performed by network experts (e.g., network administrators). Network implementation usually includes physically racking and stacking of network devices and connecting the network devices according to a planned network topology by an installer. However, an installer performing network deployment can make intentional or unintentional deviations during the network deployment process, which can cause undesired network conditions (e.g., location mismatch or topology mismatch). Consequently, network deployment process can be prolonged, which results in longer time than necessary to bring up a network and make the operation operational. Therefore, there is a need for network implementation technology that can automatically detect network deployment deviation once network devices are physically racked and connected according to a network topology.

SUMMARY

Embodiments of a device and method are disclosed. In an embodiment, a method of network deployment involves at a cloud server, determining a planned network design for a network to be deployed at a customer site, at the cloud server, receiving network device information and location information of a network device after the network device is deployed at the customer site, and at the cloud server, automatically performing network deployment deviation detection for the network device based on the planned network design and the network device information and the location information of the network device. Other embodiments are also described.

In an embodiment, the method further includes from the cloud server, reporting a network deployment deviation associated with the network device to an operator when the network deployment deviation associated with the network device is detected at the cloud server.

In an embodiment, at the cloud server, automatically performing network deployment deviation detection for the network device based on the planned network design and the network device information and the location information of the network device includes at the cloud server, detecting a network deployment location deviation associated with the network device based on a planned location of the network device at the customer site in the planned network design and the location information of the network device.

In an embodiment, the location information of the network device includes a deployed location of the network device at the customer site.

In an embodiment, at the cloud server, detecting the network deployment location deviation associated with the network device based on the planned location of the network device at the customer site in the planned network design and the location information of the network device includes at the cloud server, detecting the network deployment location deviation associated with the network device when the planned location of the network device at the customer site in the planned network design is different from the deployed location of the network device at the customer site.

In an embodiment, the method further includes from the cloud server, reporting the network deployment location deviation associated with the network device to an operator when the network deployment location deviation associated with the network device is detected at the cloud server.

In an embodiment, at the cloud server, automatically performing network deployment deviation detection for the network device based on the planned network design and the network device information and the location information of the network device includes at the cloud server, detecting a network deployment topology deviation associated with the network device based on a deployment rule set and connectivity information of the network device.

In an embodiment, the method further includes from the cloud server, reporting the network deployment topology deviation associated with the network device to an operator when the network deployment topology deviation associated with the network device is detected at the cloud server.

In an embodiment, the method further includes from the cloud server, reporting a network deployment addition or omission deviation to an operator when a network element that is not listed in the planned network design is detected by the cloud server as being deployed at the customer site.

In an embodiment, the method further includes at the cloud server, receiving hardware failure information of the network device from the network device.

In an embodiment, the method further includes from the cloud server, reporting a network deployment hardware deviation associated with the network device to an operator in response to the hardware failure information of the network device.

In an embodiment, a method of network deployment involves at an installer device, receiving an installation job for deploying a network at a customer site, at the installer device, scanning a code of a network device at the customer site to obtain network device information, and from the installer device, sending the network device information and location information of the network device at the customer site to a cloud server for automatic network deployment deviation detection.

In an embodiment, the method further includes at the installer device, receiving a report of a network deployment deviation associated with the network device from the cloud server, and at the installer device, determining whether an installer operating the installer device intentionally makes the network deployment deviation associated with the network device.

In an embodiment, the method further includes addressing the network deployment deviation associated with the network device when the installer operating the installer device does not intentionally make the network deployment deviation associated with the network device.

In an embodiment, the network deployment deviation associated with the network device includes a network deployment location deviation associated with the network device, and addressing the network deployment deviation associated with the network device when the installer operating the installer device does not intentionally make the network deployment deviation associated with the network device includes moving the network device from a deployed location of the network device at the customer site to a planned location of the network device at the customer site.

In an embodiment, the network deployment deviation associated with the network device includes a network deployment topology deviation associated with the network device, and addressing the network deployment deviation associated with the network device when the installer operating the installer device does not intentionally make the network deployment deviation associated with the network device includes changing network connectivity of the network device based on a planned network design at the customer site.

In an embodiment, the method further includes at the installer device, receiving a report of a network deployment addition or omission deviation from the cloud server and addressing the network deployment addition or omission deviation by removing or adding at least network device at the customer site based on a planned network design at the customer site.

In an embodiment, the method further includes at the installer device, receiving a report of a network deployment hardware deviation associated with the network device from the cloud server and addressing the network deployment hardware deviation by replacing at least one component of the network device.

In an embodiment, a method of network deployment involves receiving an installation job for deploying a network at a customer site at a mobile application of an installer device, scanning a two-dimensional (2D) code of a network device at a customer site using the mobile application to obtain network device information, sending the network device information and location information of the network device at the customer site from the mobile application to a cloud server for automatic network deployment deviation detection, and receiving a report of a network deployment deviation associated with the network device at the mobile application from the cloud server.

In an embodiment, the method further includes in the mobile application, presenting an interface querying an installer operating the installer device whether or not the installer intentionally makes the network deployment deviation associated with the network device.

Other aspects in accordance with the invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Figure 1:
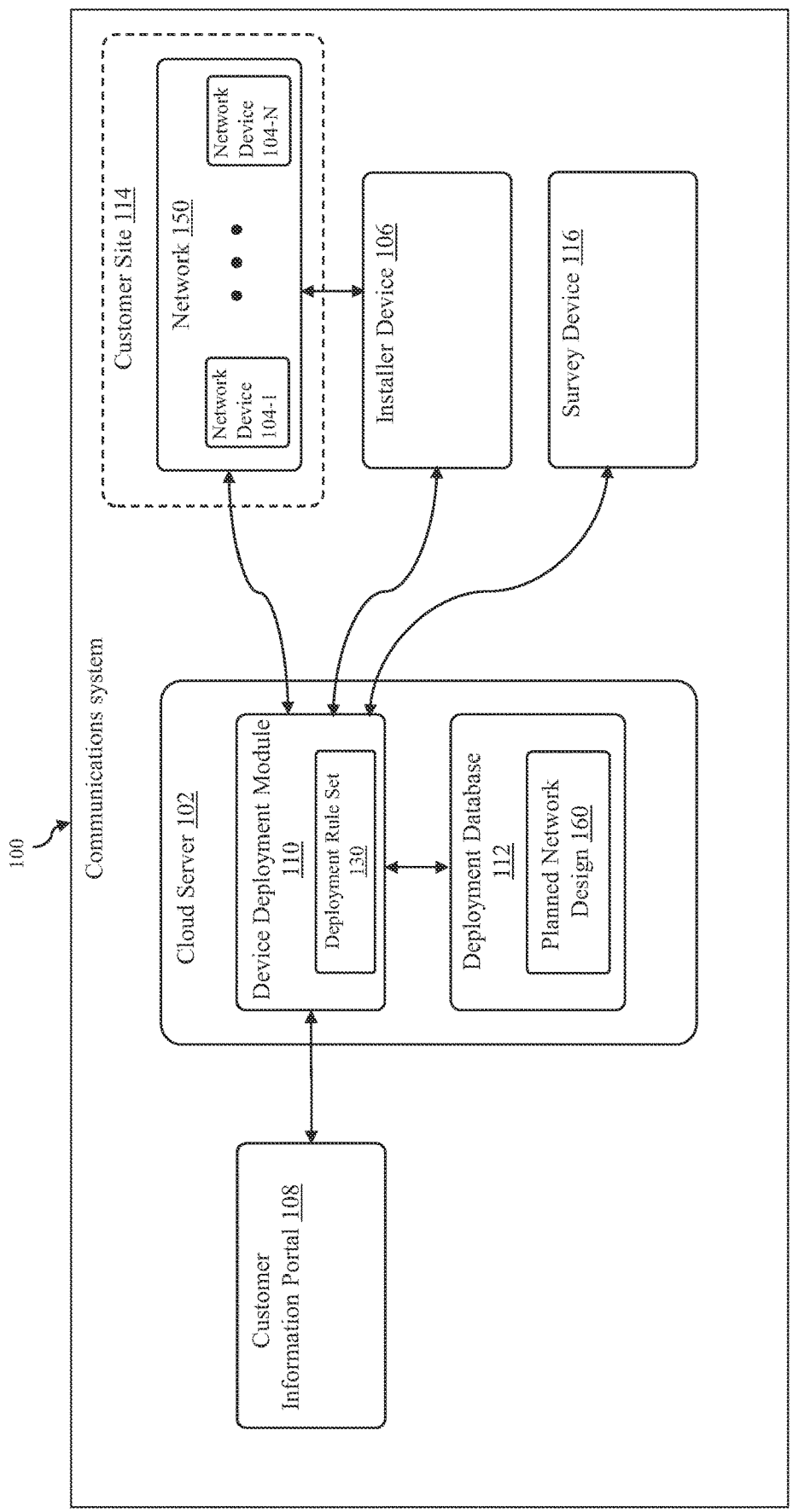
FIG. 1 depicts a communications system in accordance to an embodiment of the invention.

FIG. 1 depicts a communications system 100 in accordance to an embodiment of the invention. In the embodiment depicted in FIG. 1, the communications system includes a cloud server 102, a deployed network 150 within a customer site 114, an installer device 106, a survey device 116, and an optional customer information portal 108. The cloud server, the deployed network, the installer device, the survey device, and/or the customer information portal may be implemented in hardware (e.g., circuits), software, firmware, or a combination thereof. Although the illustrated communications system 100 is shown with certain components and described with certain functionality herein, other embodiments of the communications system may include fewer or more components to implement the same, less, or more functionality. For example, in some embodiments, the communications system includes more than one cloud server, more than one deployed network, more than one customer site, more than one installer device, more than one survey device, and/or more than one customer information portal. In another example, although the cloud server, the deployed network, the customer site, the installer device, the survey device, and the customer information portal are shown in FIG. 1 as being connected in certain topology, the network topology of the communications system 100 is not limited to the topology shown in FIG. 1.

The cloud server 102 can be used to provide at least one service to a customer site (e.g., to the deployed network 150 located at the customer site 114). The cloud server may be configured to facilitate or perform automatic network deployment deviation detection of network devices (e.g., the deployed network 150) at the customer site. Because the cloud server can facilitate or perform automatic network deployment deviation detection of network devices at the customer site, network implementation efficiency and accuracy can be improved. In addition, because the cloud server can facilitate or perform automatic network deployment deviation detection of network devices at the customer site, a network implementation operator (e.g., an operator of the installer device 106) does not need to be a network expert. For example, a network implementation operator may be a layperson (e.g., a worker on-site or an end-user such as an employee) at the customer site. Consequently, network implementation of network devices can be performed without relying on the expertise of an on-site network expert. For example, a layperson can perform network implementation functions in small offices and branches. Consequently, network deployment time can be shortened and the labor cost for network deployment can be reduced. In some embodiments, the cloud server is configured to perform automatic network design for a network to be deployed or installed at the customer site. In some embodiments, the cloud server is configured to determine a planned network design for a network to be deployed at a customer site, to receive network device information and location information of a network device after the network device is deployed at the customer site, and to automatically perform network deployment deviation detection for the network device based on the planned network design and the network device information and the location information of the network device. In some embodiments, the cloud server is configured to report a network deployment deviation associated with the network device to an operator when the network deployment deviation associated with the network device is detected at the cloud server. In some embodiments, the cloud server is configured to detect a network deployment location deviation associated with the network device based on a planned location of the network device at the customer site in the planned network design and the location information of the network device, which may include a deployed location of the network device at the customer site. In some embodiments, the cloud server is configured to detect the network deployment location deviation associated with the network device when the planned location of the network device at the customer site in the planned network design is different from the deployed location of the network device at the customer site. In some embodiments, the cloud server is configured to report the network deployment location deviation associated with the network device to an operator when the network deployment location deviation associated with the network device is detected at the cloud server. In some embodiments, the cloud server is configured to detect a network deployment topology deviation associated with the network device based on a deployment rule set and connectivity information of the network device. In some embodiments, the cloud server is configured to report the network deployment topology deviation associated with the network device to an operator when the network deployment topology deviation associated with the network device is detected at the cloud server. In some embodiments, the cloud server is configured to report a network deployment addition or omission deviation to an operator when a network element that is not listed in the planned network design is detected by the cloud server as being deployed at the customer site. In some embodiments, the cloud server is configured to receive hardware failure information of the network device from the network device. In some embodiments, the cloud server is configured to report a network deployment hardware deviation associated with the network device to an operator in response to the hardware failure information of the network device. The cloud server may be implemented in hardware (e.g., circuits), software, firmware, or a combination thereof. In some embodiments, the cloud server is implemented on a server grade hardware platform, such as an x86 architecture platform. For example, the hardware platform of the cloud server may include conventional components of a computing device, such as one or more processors (e.g., CPUs), system memory, a network interface, storage system, and other Input/Output (I/O) devices such as, for example, a mouse and a keyboard (not shown). In some embodiments, the processor is configured to execute instructions such as, for example, executable instructions that may be used to perform one or more operations described herein and may be stored in the memory and the storage system. In some embodiments, the memory is volatile memory used for retrieving programs and processing data. The memory may include, for example, one or more random access memory (RAM) modules. In some embodiments, the network interface is configured to enable the cloud server to communicate with another device via a communication medium. The network interface may be one or more network adapters, also referred to as a Network Interface Card (NIC). In some embodiments, the cloud server includes local storage devices (e.g., one or more hard disks, flash memory modules, solid state disks and optical disks) and/or a storage interface that enables the host to communicate with one or more network data storage systems, which are used to store information, such as executable instructions, cryptographic keys, virtual disks, configurations and other data.

In the embodiment depicted in FIG. 1, the cloud server includes a device deployment module 110 and a deployment database 112 configured to store deployment data. In some embodiments, the device deployment module 110 is configured to facilitate or perform automatic network deployment deviation detection of network devices (e.g., the deployed network 150) at the customer site 114, for example, using a deployment rule set 130. The deployment rule set 130 may include one or more device deployment rules for deploying network devices at the customer site 114. In some embodiments, the device deployment module 110 is configured to facilitate or perform automatic network deployment deviation detection of network devices (e.g., the deployed network 150) at the customer site 114 based on, for example, a planned network design 160 that is stored in the deployment database. The planned network design may include a list of network devices to be deployed at the customer site 114, a network topology of the network devices, and/or corresponding network configurations and/or location information (e.g., building information, floor information, and/or in-building location information) of the network devices. Because the device deployment module can facilitate automatic network deployment deviation detection of network devices at the customer site, network implementation efficiency and accuracy can be improved. In addition, because the device deployment module can facilitate automatic network deployment deviation detection of network devices at the customer site, a network implementation operator (e.g., an operator of the installer device 106) does not need to be a network expert. For example, a network implementation operator may be a layperson (e.g., a worker on-site or an end-user such as an employee) at the customer site. Consequently, network deployment time can be shortened and the labor cost for network deployment can be reduced. In some embodiments, the device deployment module is configured to determine a planned network design for a network to be deployed at a customer site, to receive network device information and location information of a network device after the network device is deployed at the customer site, and to automatically perform network deployment deviation detection for the network device based on the planned network design and the network device information and the location information of the network device. In some embodiments, the device deployment module is configured to report a network deployment deviation associated with the network device to an operator when the network deployment deviation associated with the network device is detected at the cloud server. In some embodiments, the device deployment module is configured to detect a network deployment location deviation associated with the network device based on a planned location of the network device at the customer site in the planned network design and the location information of the network device, which may include a deployed location of the network device at the customer site. In some embodiments, the device deployment module is configured to detect the network deployment location deviation associated with the network device when the planned location of the network device at the customer site in the planned network design is different from the deployed location of the network device at the customer site. In some embodiments, the device deployment module is configured to report the network deployment location deviation associated with the network device to an operator when the network deployment location deviation associated with the network device is detected at the cloud server. In some embodiments, the device deployment module is configured to detect a network deployment topology deviation associated with the network device based on a deployment rule set and connectivity information of the network device. In some embodiments, the device deployment module is configured to report the network deployment topology deviation associated with the network device to an operator when the network deployment topology deviation associated with the network device is detected at the cloud server. In some embodiments, the device deployment module is configured to report a network deployment addition or omission deviation to an operator when a network element that is not listed in the planned network design is detected by the cloud server as being deployed at the customer site. In some embodiments, the device deployment module is configured to receive hardware failure information of the network device from the network device. In some embodiments, the device deployment module is configured to report a network deployment hardware deviation associated with the network device to an operator in response to the hardware failure information of the network device. The device deployment module may be configured to perform a network device deployment service (e.g., a location based network device deployment service) for network devices and/or to perform automatic network design for a network at the customer site 114. In some embodiments, the deployment database 112 is configured to store deployment data for a network deployed and/or to be deployed at the customer site (e.g., a list of network devices deployed or to be deployed at the customer site). For example, the deployment database 112 is configured to store the planned network design 160, which may include a list of network devices to be deployed at the customer site 114, a network topology of network devices and corresponding network configurations and/or location information (e.g., building information, floor information, and/or in-building location information) of the network devices. In some embodiments, the deployment database is configured to store a list of network devices deployed or to be deployed at the customer site and detailed information related to the network devices, for example, device type information of the network devices, deployment topology information that defines how network devices are connected to each other, and/or device location information (e.g., building information, floor information, and in-building location information) of network devices deployed or to be deployed at the customer site.

The customer site 114 may include one or more buildings, and each building may include one or more floors. Network devices that can be deployed at the customer site may include any type of suitable network devices. For example, network devices may be designated to be deployed to a specific building, a specific floor within a building, and/or a specific location on a floor of a building. A network device that can be deployed at the customer site may be fully or partially implemented as an Integrated Circuit (IC) device.

In the embodiment depicted in FIG. 1, the network 150 includes one or more network devices 104-1, . . . , 104-N, where N is a positive integer. In some embodiments, at least one of the one or more network devices 104-1, . . . , 104-N is a wired and/or wireless communications device that includes at least one processor (e.g., a microcontroller, a digital signal processor (DSP), and/or a central processing unit (CPU)), at least one wired or wireless communications transceiver implemented in one or more logical circuits and/or one or more analog circuits, at least one wired or wireless communications interface and that supports at least one wired or wireless communications protocol, and/or at least one antenna. For example, at least one of the one or more network devices 104-1, . . . , 104-N may be compatible with Institute of Electrical and Electronics Engineers (IEEE) 802.3 protocol and/or one or more wireless local area network (WLAN) communications protocols, such as IEEE 802.11 protocol. In some embodiments, at least one of the one or more network devices 104-1, . . . , 104-N is a wired communications device that is compatible with at least one wired local area network (LAN) communications protocol, such as a wired router (e.g., an Ethernet router), a wired switch, a wired hub, or a wired bridge device (e.g., an Ethernet bridge). In some embodiments, at least one of the one or more network devices 104-1, . . . , 104-N is a wireless access point (AP) that connects to a local area network (e.g., a LAN) and/or to a backbone network (e.g., the Internet) through a wired connection and that wirelessly connects to wireless stations (STAs), for example, through one or more WLAN communications protocols, such as an IEEE 802.11 protocol. In some embodiments, at least one of the one or more network devices 104-1, . . . , 104-N is a wireless station (STA) that wirelessly connects to a wireless AP. For example, at least one of the one or more network devices 104-1, . . . , 104-N may be a laptop, a desktop personal computer (PC), a mobile phone, or other wireless device that supports at least one WLAN communications protocol (e.g., an IEEE 802.11 protocol)). In some embodiments, the deployed network 150 is implemented using a standardized network block or a network service block (NSB) that includes a specific combination of network devices. In an embodiment, the deployed network 150 may be designed as a set of one or more NSBs. In an embodiment, an NSB is the foundational building block for network design and is replicable. The standardization of an NSB reduces the complexity in the network design and, hence makes the network design and Bill of Materials (BoM) generation automatable. In some embodiments, the NSB includes at least one distribution switch (DS) or distribution layer switch that functions as a bridge between at least one core layer switch and at least one access layer switch, at least one head end (HE) or gateway, at least one access switch (AS), at least one wireless access point (AP) connected to the at least one AS, and/or at least one wireless or wired sensor that wirelessly connects to the at least one wireless AP or is connected to the at least one wireless AP through at least one electrical cable or wire. However, the types of network devices that can be supported by an NSB are not limited to the examples described. In some embodiments, the number of HEs and DSs is constant in an NSB while the number of the wireless APs, the ASs and the sensors in an NSB varies.

Figure 2:
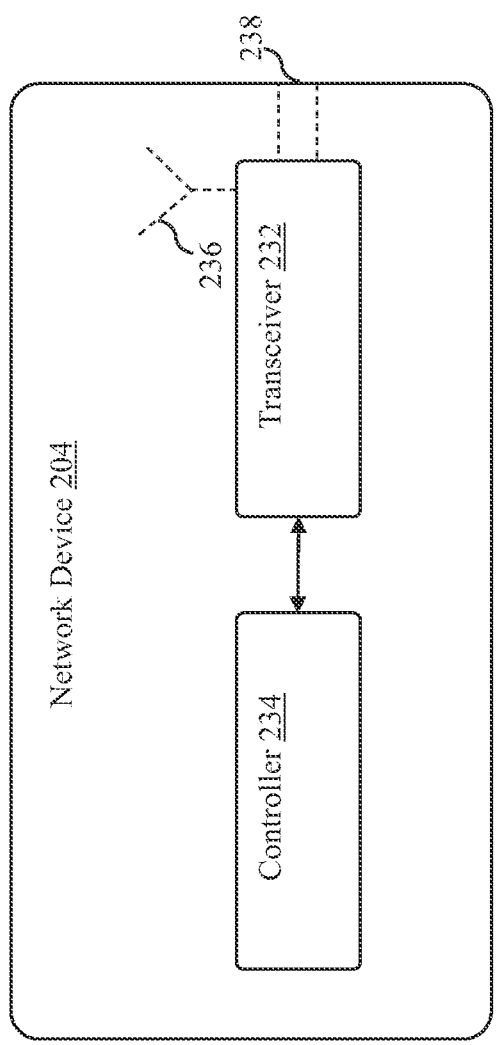
FIG. 2 depicts an embodiment of a network device of the communications system depicted in FIG. 1.

FIG. 2 depicts an embodiment of a network device 204 of the communications system 100 depicted in FIG. 1. The network device 204 may be an embodiment of the one or more network devices 104-1, . . . , 104-N that are included in the deployed network 150 depicted in FIG. 1. However, the one or more network devices 104-1, . . . , 104-N that are included in the deployed network 150 depicted in FIG. 1 are not limited to the embodiment depicted in FIG. 2. The network device 204 may be any suitable type of network device, e.g., a distribution switch, a gateway, an access switch, a wireless access point, or a sensor. In the embodiment depicted in FIG. 2, the network device 204 includes a wireless and/or wired transceiver 232, a controller 234 (e.g., a microcontroller, a DSP, and/or a CPU) operably connected to the transceiver 232, at least one optional antenna 236 operably connected to the transceiver 232, and at least one optional network port 238 operably connected to the transceiver 232. In some embodiments, the transceiver 232 includes a physical layer (PHY) device. The transceiver 232 may be any suitable type of transceiver. For example, the transceiver 232 may be a short-range communications transceiver (e.g., a Bluetooth) or a LAN transceiver (e.g., a transceiver compatible with an IEEE 802.11 protocol). In some embodiments, the network device 204 includes multiple transceivers, for example, a short-range communications transceiver (e.g., a Bluetooth) and a LAN transceiver (e.g., a transceiver compatible with an IEEE 802.11 protocol). The controller 234 may be configured to control the transceiver 232 to process to process packets received through the antenna 236 and/or the network port 238 and/or to generate outgoing packets to be transmitted through the antenna 236 and/or the network port 238. The antenna 236 may be any suitable type of antenna. For example, the antenna 236 may be an induction type antenna such as a loop antenna or any other suitable type of induction type antenna. However, the antenna 236 is not limited to an induction type antenna. The network port 238 may be any suitable type of port. For example, the network port 238 may be a local area network (LAN) network port such as an Ethernet port. However, the network port 238 is not limited to LAN network ports.

Turning back to the communications system 100 depicted in FIG. 1, the installer device 106 may be any type of suitable network device that is used by an operator to facilitate the deployment of network devices (e.g., the network 150) at the customer site 114. In some embodiments, the installer device may be fully or partially implemented as an IC device. In some embodiments, the installer device is a wireless communications device that includes at least one processor (e.g., a microcontroller, a DSP, and/or a CPU), at least one wireless communications transceiver, at least one wireless communications interface, and/or at least one antenna and that supports at least one wireless communications protocol. In some embodiments, the installer device is a handheld wireless device, such as a cellular phone or a mobile phone (e.g., a smart phone), a pad computer, a Personal Digital Assistant (PDA) etc. that supports one or more radio frequency (RF) communications protocols, including without limitation, Bluetooth, The Global System for Mobile Communications (GSM), Universal Mobile Telecommunications System (UMTS), Code Division Multiple Access (CDMA), Worldwide Interoperability for Microwave Access (WiMax) and communications protocols as defined by the 3rd Generation Partnership Project (3GPP) or the 3rd Generation Partnership Project 2 (3GPP2), 4G Long Term Evolution (LTE), the fifth generation technology standard for broadband cellular network (5G), and IEEE 802.16 standards bodies and/or one or more wireless local area network (WLAN) communications protocols, such as an IEEE 802.11 protocol. For example, the installer device 106 is a wireless communications device, such as a handheld wireless device (e.g., cellular phone or a mobile phone) that supports multiple communications protocols, which may include at least one cellular communications protocol and at least short-range communications protocol (e.g., Bluetooth). In some embodiments, automatic network deployment deviation detection software or App is installed on the installer device 106 (e.g., a mobile phone or tablet). In some embodiments, the installer device is configured to receive an installation job for deploying a network at a customer site, to scan a code of a network device at the customer site to obtain network device information, and to send the network device information and location information of the network device at the customer site to a cloud server for automatic network deployment deviation detection. In some embodiments, the installer device is configured to receive a report of a network deployment deviation associated with the network device from the cloud server and to determine whether an installer operating the installer device intentionally makes the network deployment deviation associated with the network device. In some embodiments, the installer device is configured to address the network deployment deviation associated with the network device when the installer operating the installer device does not intentionally make the network deployment deviation associated with the network device. In some embodiments, the network deployment deviation associated with the network device includes a network deployment location deviation associated with the network device, and the installer device is configured to move the network device from a deployed location of the network device at the customer site to a planned location of the network device at the customer site. In some embodiments, the network deployment deviation associated with the network device includes a network deployment topology deviation associated with the network device, and the installer device is configured to change network connectivity of the network device based on a planned network design at the customer site. In some embodiments, the installer device is configured to receive a report of a network deployment addition or omission deviation from the cloud server and to address the network deployment addition or omission deviation by removing or adding at least network device at the customer site based on a planned network design at the customer site. In some embodiments, the installer device is configured to receive a report of a network deployment hardware deviation associated with the network device from the cloud server and to address the network deployment hardware deviation by replacing at least one component of the network device. In some embodiments, the installer device is configured to receive an installation job for deploying a network at a customer site at a mobile application of an installer device, to scan a two-dimensional (2D) code of a network device at a customer site using the mobile application to obtain network device information, to send the network device information and location information of the network device at the customer site from the mobile application to a cloud server for automatic network deployment deviation detection, and to receive a report of a network deployment deviation associated with the network device at the mobile application from the cloud server. In some embodiments, the installer device is configured to, in the mobile application, present an interface querying an installer operating the installer device whether or not the installer intentionally makes the network deployment deviation associated with the network device.

Figure 3:
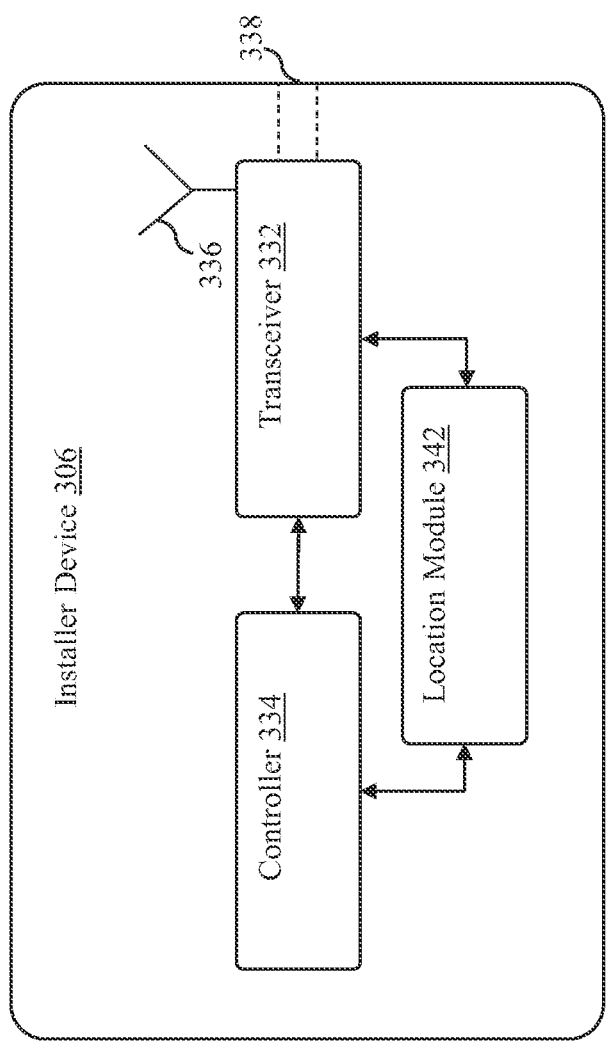
FIG. 3 depicts an embodiment of an installer device of the communications system depicted in FIG. 1.

FIG. 3 depicts an embodiment of an installer device 306 of the communications system 100 depicted in FIG. 1. The installer device 306 depicted in FIG. 3 is an embodiment of the installer device 106 depicted in FIG. 1. However, the installer device 106 depicted in FIG. 1 are not limited to the embodiment depicted in FIG. 3. In the embodiment depicted in FIG. 3, the installer device 306 includes a wireless and/or wired transceiver 332, a controller 334 (e.g., a microcontroller, a DSP, and/or a CPU) operably connected to the transceiver 332, at least one antenna 336 operably connected to the transceiver 332, at least one optional network port 338 operably connected to the transceiver 332, and a location module 342. In some embodiments, the installer device 306 is a handheld wireless device, such as a cellular phone or a mobile phone (e.g., a smart phone), a pad computer, a Personal Digital Assistant (PDA) etc. that supports one or more RF communications protocols. In some embodiments, the transceiver 332 includes a physical layer (PHY) device. The transceiver 332 may be any any suitable type of transceiver. For example, the transceiver 332 may be a short-range communications transceiver (e.g., a Bluetooth) or a LAN transceiver (e.g., a transceiver compatible with an IEEE 802.11 protocol). In some embodiments, the installer device 306 includes multiple transceivers, for example, a short-range communications transceiver (e.g., a Bluetooth) and a LAN transceiver (e.g., a transceiver compatible with an IEEE 802.11 protocol). The controller 334 may be configured to control the transceiver 332 to process to process packets received through the antenna 336 and/or the network port 338 and/or to generate outgoing packets to be transmitted through the antenna 336 and/or the network port 338. The antenna 336, which may be optional in some implementations, may be any suitable type of antenna. For example, the antenna 336 may be an induction type antenna such as a loop antenna or any other suitable type of induction type antenna. However, the antenna 336 is not limited to an induction type antenna. The network port 338 may be any suitable type of port. For example, the network port 338 may be a local area network (LAN) network port such as an Ethernet port. However, the network port 338 is not limited to LAN network ports. The location module 342 is configured to determine or obtain location information of the installer device or a device that is associated with (e.g., connected with or in the vicinity of) the installer device. Examples of location information that can be determined or obtained by the location module 342 include without being limited to, address information in a map/navigation system, coordinate information in a map/navigation system, latitude and longitude information in a map/navigation system, and relative positional information in a map/navigation system. In some embodiments, the location information that can be determined or obtained by the location module 342 includes one or more X, Y coordinates and/or Global Positioning System (GPS) coordinates or other global or satellite location system coordinates. In some embodiments, the location module 342 is a GPS or other global or satellite location system module that includes a GPS receiver or other global or satellite. In some embodiments, the location module 342 uses location techniques such as triangulation or in-door beacon based location technique to determine or obtain location information of the installer device or a device that is associated with (e.g., connected with or in the vicinity of) the installer device.

Turning back to the communications system 100 depicted in FIG. 1, the survey device 116 may be any type of suitable network device that is used by a technician to facilitate network design for the customer site 114. The survey device may be fully or partially implemented as an IC device. In some embodiments, the survey device is a computing device that includes at least one processor (e.g., a microcontroller, a DSP, and/or a CPU), at least one communications transceiver, and at least one communications interface and that supports at least one communications protocol. For example, the survey device is a wireless communications device that includes at least one wireless communications transceiver, at least one wireless communications interface, and/or at least one antenna and that supports at least one wireless communications protocol. In some embodiments, the survey device is a handheld wireless device, such as a cellular phone or a mobile phone (e.g., a smart phone), a pad computer, a Personal Digital Assistant (PDA) etc. that supports one or more radio frequency (RF) communications protocols, including without limitation, GSM, UMTS, CDMA, WiMax and communications protocols as defined by 3GPP or 3GPP2, 4G LTE, 5G, and IEEE 802.16 standards bodies and/or one or more WLAN communications protocols, such as IEEE 802.11 protocol. In some embodiments, site survey software (e.g., a commonly used Wi-Fi design and spectrum analysis software or App) is installed on the survey device (e.g., a mobile phone or tablet). In some embodiments, the survey device may include a special-purpose device (e.g., a spectrum analyzer device) configured to measure the wireless signal strength at the customer site. Site survey information that is generated by the survey device may include wired connectivity information for the customer site, such as the number of wired port(s), type of wired port(s) (e.g., power over ethernet (PoE) vs. non-PoE), and/or the location(s) of port(s) available at the customer site and/or to be newly installed at the customer site, and/or wireless connectivity information for the customer site, such as the number of wireless APs available at the customer site and/or to be newly installed at the customer site to deliver the coverage and capacity required for the customer site. In some embodiments, the survey result information of the customer site 114 includes the location and the number of wired port(s) needed for the customer site on a per floor basis, whether or not there is enough power outlet(s) and rack space(s) available to deploy network device(s), an optimal number of wireless AP(s) to be installed and location(s) on a per floor basis to meet the coverage and capacity requirements of the customer site, and/or any co-channel interference between wireless APs. In some embodiments, the survey device transmits the survey result information of the customer site 114 from a mobile app installed in the survey device to the device deployment module 110. In some embodiments, a technician uses the survey device 116 to perform a site survey at the customer site 114 to obtain the site survey result information. In some embodiments, the technician uses information in a mobile app installed in the survey device to perform a site survey at the customer site. For example, the survey device is a handheld wireless device, such as a cellular phone or a mobile phone (e.g., a smart phone), a pad computer, a PDA etc., and the mobile app is a mobile application from an application store (e.g., Android Market, Apple App Store, Amazon Appstore, carrier applications stores, etc.). In some embodiments, a technician uses the survey device 116 to perform a site survey at the customer site based on customer wired and/or wireless requirements. In some embodiments, the survey device 116 is configured to identify the location and the number of wired port(s) to be installed at the customer site on a per floor basis, to identify if there is enough power outlet(s) and rack space(s) available to deploy network device(s), to identify an optimal number of wireless AP(s) to be installed at the customer site and location(s) on a per floor basis to meet the coverage and capacity requirements of the customer site, and/or to identify any co-channel interference between wireless APs.

The customer information portal 108, which may be optional to the communications system 100, is configured to receive customer information. In some embodiments, the customer information portal includes a user interface that allows a customer to input information associated with network design for the customer site 114, such as one or more specific requirements or restrictions. For example, the user interface (e.g., a graphical user interface (GUI)) may allow a customer to input information associated with network design for the customer site. The customer information portal may be implemented in hardware (e.g., circuits), software, firmware, or a combination thereof.

Figure 4:
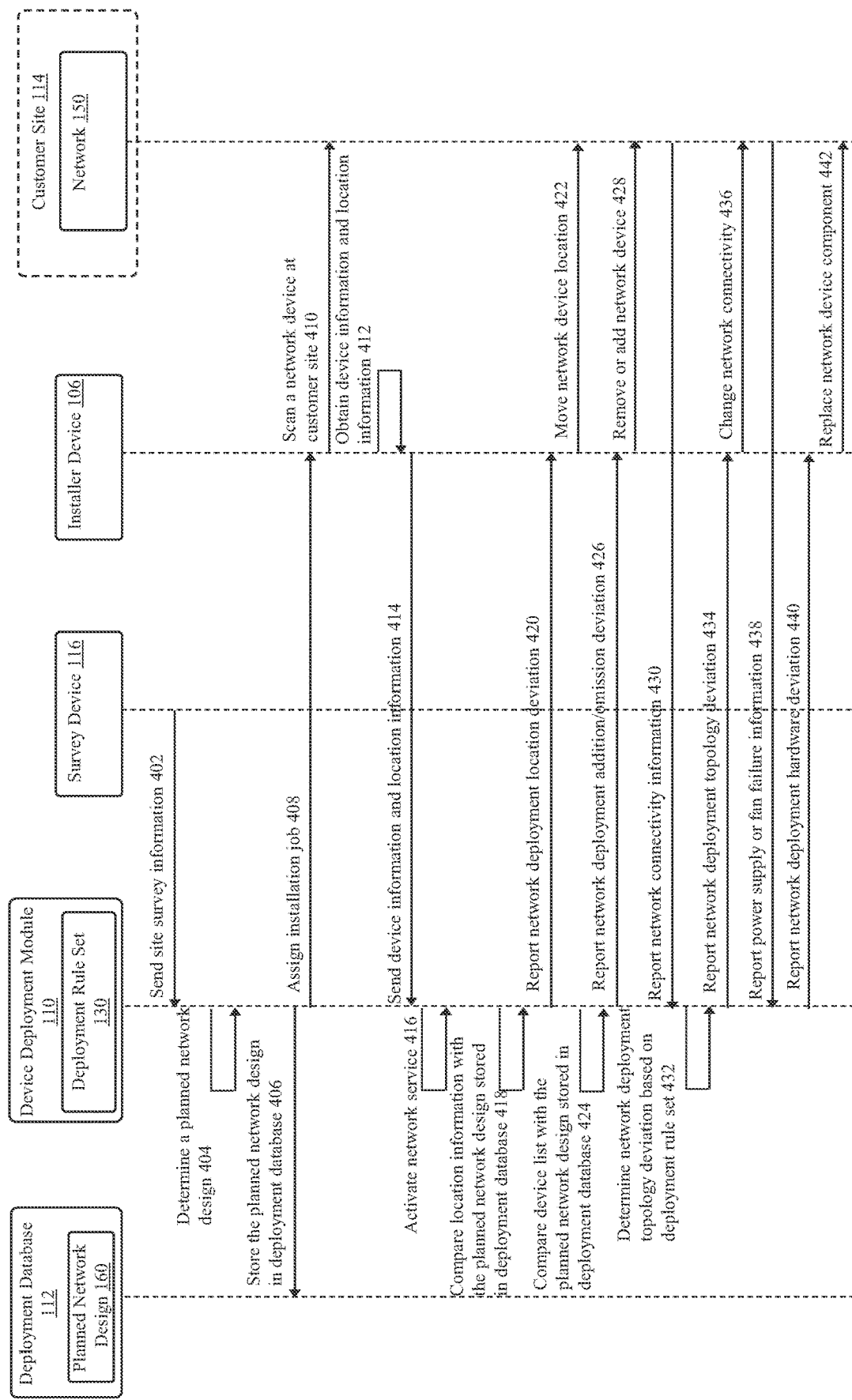
FIG. 4 shows a swim-lane diagram illustrating an example procedure of automatic network deployment deviation detection in the communications system depicted in FIG. 1.

FIG. 4 shows a swim-lane diagram illustrating an example procedure for automatic network deployment deviation detection in the communications system 100 depicted in FIG. 1. In this automatic network deployment deviation detection procedure, a deviation in a network device deployment is automatically detected by the device deployment module 110 of the cloud server 102, for example, based on the planned network design 160 stored in the deployment database 112 and/or the deployment rule set 130, which includes one or more network deployment deployment rules. Although operations in the example procedure in FIG. 4 are described in a particular order, in some embodiments, the order of the operations in the example procedure may be altered so that certain operations may be performed in an inverse order or so that certain operations may be performed, at least in part, concurrently with other operations.

In operation 402, the survey device 116 transmits survey information of the customer site 114 to the device deployment module 110 of the cloud server 102. The site survey information may include wired connectivity information for the customer site, such as the number of wired port(s), type of wired port(s) (e.g., power over ethernet (PoE) vs. non-PoE), and/or the location(s) of port(s) available at the customer site and/or to be newly installed at the customer site, and/or wireless connectivity information for the customer site, such as the number of wireless APs available at the customer site and/or to be newly installed at the customer site to deliver the coverage and capacity required for the customer site. In some embodiments, the survey information of the customer site 114 includes the location and the number of wired port(s) needed for the customer site on a per floor basis, whether or not there is enough power outlet(s) and rack space(s) available to deploy network device(s), an optimal number of wireless AP(s) to be installed and location(s) on a per floor basis to meet the coverage and capacity requirements of the customer site, and/or any co-channel interference between wireless APs.

In operation 404, the device deployment module 110 of the cloud server 102 determines network information (e.g., the planned network design 160) for a network to be deployed at the customer site 114 based on the survey information received from the survey device 116. In some embodiments, the network design may also include a Bill of Materials (BoM) and a connectivity map for the network to be deployed at the customer site. Compared to manually determining BoM data (e.g., required network elements) for a network to be deployed at a customer site, the device deployment module 110 of the cloud server 102 can automatically determine a BoM for a network at a customer site (e.g., the customer site 114). Consequently, network design efficiency and accuracy can be improved. In addition, compared to designing network topology for a network at a customer site after the network is installed at the customer site, the device deployment module 110 can automatically generate a topology map for a network at a customer site prior to deploying the network at the customer site. Consequently, time required for network design for a customer site can be shortened or reduced. The list of network elements to be newly installed at the customer site 114 may be generated using a standardized network block that includes a specific combination of network devices. In an embodiment, a customer network may be designed as a set of standardized network blocks, which are also referred to as network service blocks (NSBs). In some embodiments, once the BoM for a network to be deployed at the customer site is generated, the device deployment module is configured to automatically generate a connectivity map that defines how network elements in the BoM are connected to each other. In some embodiments, the automatic generation of a connectivity map is enabled by building rules using a reference topology that defines how network elements connect to each other and network ports to be used by the network elements (i.e., allowed ports) for the connectivity. For example, a specific device (e.g., a network switch) may include a first set of ports (e.g., 1-24) that are of a first type (e.g., 10/25GE Small Form-Factor Pluggable (SFP)28, 10/25GE SFP28 or 100G Quad Small Form-Factor Pluggable (QSFP)28) and are used to connect the specific device with a first sets of network devices (e.g., APs and wired routers) and a second set of ports (e.g., 25-28) that are of a second type (e.g., 10/25GE Small Form-Factor Pluggable (SFP)28, 10/25GE SFP28 or 100G Quad Small Form-Factor Pluggable (QSFP) 28) and are used to connect the specific device with a second sets of network devices (e.g., access switches). However, the number and types of ports that a network device can have are not limited to the examples described.

After the device deployment module 110 of the cloud server 102 determines the planned network design 160 for a network to be deployed at the customer site 114, in operation 406, the device deployment module stores the planned network design 160 in the deployment database 112, which is also referred to as a planned deployment (PD) database.

After the device deployment module 110 of the cloud server 102 determines the planned network design 160 for a network to be deployed at the customer site 114, the network 150 is deployed (e.g., network devices including switches, routers, hubs, and/or wireless APs are installed) at the customer site 114 based on the planned network design 160 (e.g., the BoM and the connectivity map). In operation 408, the device deployment module 110 assigns an installation job to an installer or technician that uses the installer device 106. In some embodiments, the installer/technician uses a mobile application (app) that is installed in the installer device and is assigned the installation job via the mobile app. For example, the installer device is a handheld wireless device, such as a cellular phone or a mobile phone (e.g., a smart phone), a pad computer, a PDA etc., and the mobile app is a mobile application from an application store (e.g., Android Market, Apple App Store, Amazon Appstore, carrier applications stores, etc.). In an embodiment, an installation job that is assigned to the installer or technician includes detailed information related to a customer and network device deployment information. The detailed information related to a customer may include the name of the customer, site information of the customer, floor information of the customer, and/or the address of the customer. The network device deployment information may include a list of device(s) to be installed and device type(s), floor plan(s) and locations of a network device is to be installed in a floor plan, and/or a deployment topology that defines how network devices are connected to each other. One or more network devices to be installed are sent to a customer site. In some embodiments, there is no pre-population of device specific information (e.g., device serial number and/or media access control (MAC) address) of a network device to be installed in a central database when the network device to be installed is sent to a customer site. For example, the device deployment module 110 has no knowledge of specific information (e.g., device serial number and/or media access control (MAC) address) of a network device to be installed at a customer site before the network device is installed at the customer site.

In operation 410, an installer or a technician uses the installer device 106 to scan the one or more network devices 104-1, . . . , 104-N of the network 150 at the customer site 114. In some embodiments, the installer or technician uses information in a mobile app installed in the installer device and scans each of the network devices 104-1, . . . , 104-N at a customer location indicated by the mobile app. The installer or technician may use the installer device (e.g., a mobile app installed in the installer device) to scan a code (e.g., a Quick Response (QR) code) of each of the network devices 104-1, . . . , 104-N. The code of a network device may be on a surface of the network device and/or on the packaging (e.g., the box or the wrapper) of the network device. For example, the code of a network device may be stamped on, printed on, or attached to a surface of the network device and/or on the packaging of the network device. The code of a network device may be any suitable code that can be read (e.g., optically read) by the installer device 106, which may be a handheld device, such as a mobile phone or a tablet. For example, the code of a network device may be a QR code or a two-dimensional (2D) barcode on the network device (e.g., printed on a housing of the device itself or printed on packaging of the network device). The code (e.g., the QR code) on a network device may represent or contain the serial number of the network device, a device type of the network device, and/or MAC address information of the network device. In another example, the code of a network device is a radio-frequency identification (RFID) tag or a Near-Field-Communication (NFC) tag that can be wirelessly read by the installer device 106. In operation 412, the installer device 106 obtains information regarding the one or more network devices 104-1, . . . , 104-N of the network 150 (e.g., device information and location information of the one or more network devices 104-1, . . . , 104-N of the network 150) based on scanning of the network devices. For example, the installer device 106 obtains the serial number of each network device, a device type of each network device, and/or MAC address information of each network device based on a scanned QR code of each network device and the location of each network device during the scan of the QR code of each network device.

Figure 5:
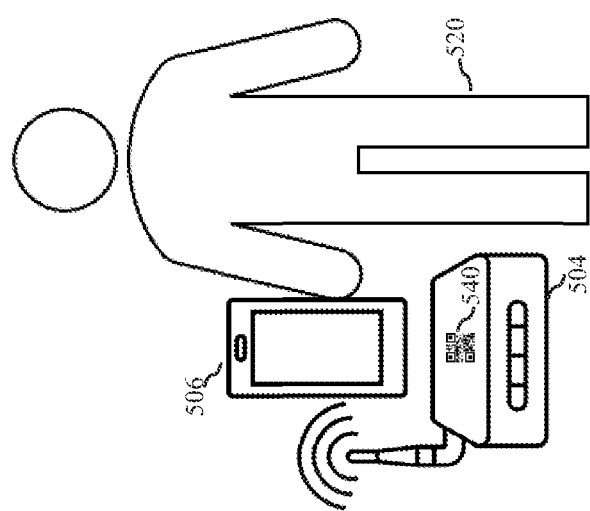
FIG. 5 depicts an installer or a technician having an installer device scanning a QR code of a wireless device (e.g., a wireless AP).

FIG. 5 depicts an installer or a technician 520 having an installer device 506 scanning a QR code 540 of a wireless device (e.g., a wireless AP) 504. The wireless device 504 depicted in FIG. 5 may be an embodiment of the one or more network devices 104-1, . . . , 104-N of the network 150 depicted in FIG. 1, while the installer device 506 depicted in FIG. 5 may be an embodiment of the installer device 106 depicted in FIG. 1. However, the network devices 104-1, . . . , 104-N and the installer device 106 depicted in FIG. 1 are not limited to the embodiment shown in FIG. 5. In the embodiment depicted in FIG. 5, the QR code 540 is on a surface of the wireless device 504. For example, the QR code 540 is stamped on, printed on, or attached to a top surface, a bottom surface, and/or a side surface of the wireless device 504. In some embodiments, the QR code 540 of the wireless device 504 is on the packaging (e.g., the box or the wrapper) of the wireless device 504. The installer or technician 520 may use a mobile app installed in the installer device 506, which may be a handheld device, such as a mobile phone or a tablet, to scan the QR code 540 on the wireless device 504 to obtain information related to the wireless device 504. In some embodiments, the information related to the wireless device 504 includes the serial number of the wireless device 504, a device type of the wireless device 504, and/or MAC address information of the wireless device 504. However, QR codes that can be used for the one or more network devices 104-1, . . . , 104-N are not limited to the embodiment depicted in FIG. 5. During the scan of the QR code 540 of the wireless device 504, the installer device 506 obtains the location of the wireless device 504, which may include one or more X, Y coordinates and/or Global Positioning System (GPS) coordinates or other global or satellite location system coordinates. In some embodiments, the installer device 506 uses a location module, which may be a GPS receiver or other global or satellite receiver, to obtain the location of the wireless device 504.

Figure 6:
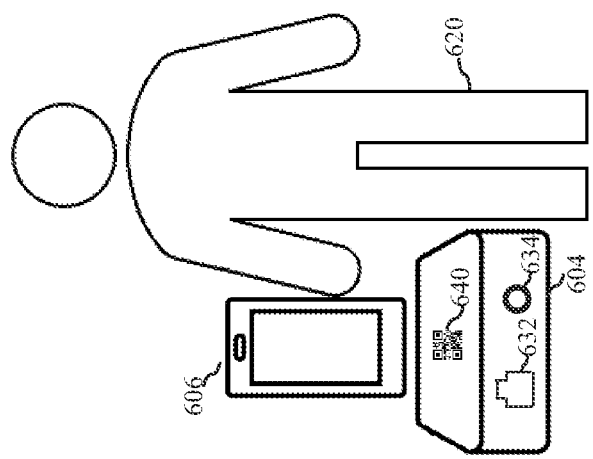
FIG. 6 depicts an installer or a technician having an installer device scanning a QR code of a wired network device.

FIG. 6 depicts an installer or a technician 620 having an installer device 606 scanning a QR code 640 of a wired network device 604. The wired network device 604 depicted in FIG. 6 may be an embodiment of the one or more network devices 104-1, ..., 104-N of the network 150 depicted in FIG. 1, while the installer device 606 depicted in FIG. 6 may be an embodiment of the installer device 106 depicted in FIG. 1. However, the network devices 104-1, ..., 104-N and the installer device 106 depicted in FIG. 1 are not limited to the embodiment shown in FIG. 6. In some embodiments, the wired communications device is a wired router (e.g., an Ethernet router), a wired switch (e.g., an Ethernet switch), a wired bridge device (e.g., an Ethernet bridge), or a wired hub. In the embodiment depicted in FIG. 6, the QR code 640 is on a surface of the wired network device, which may include a communications port (e.g., an Ethernet port) 632 and a power connection port 634. For example, the QR code 640 is stamped on, printed on, or attached to a top surface, a bottom surface, and/or a side surface of the wired network device. In some embodiments, the QR code 640 of the wired network device is on the packaging (e.g., the box or the wrapper) of the wired network device. The installer or technician may use a mobile app installed in the installer device 106, which may be a handheld device, such as a mobile phone or a tablet, to scan the QR code 640 on the wired network device to obtain the serial number of the wired network device, a device type of the wired network device, and/or MAC address information of the wired network device. However, QR codes that can be used for the network devices 104-1, ..., 104-N are not limited to the embodiment depicted in FIG. 6. During the scan of the QR code 640 of the wired network device, the installer device 606 obtains the location of the wired network device, which may include one or more X, Y coordinates and/or Global Positioning System (GPS) coordinates or other global or satellite location system coordinates. In some embodiments, the installer device 606 uses a location module, which may be a GPS receiver or other global or satellite receiver, to obtain the location of the wired network device.

Turning back to the swim-lane diagram shown in FIG. 4, in operation 414, the installer device 106 transmits the information regarding each of the network devices 104-1, ..., 104-N that is obtained from a scan of the network device and/or location information of the network device to the device deployment module 110 of the cloud server 102. Examples of location information of a network device include without being limited to, address information in a map/navigation system, coordinate information in a map/navigation system, latitude and longitude information in a map/navigation system, and relative positional information in a map/navigation system. In some embodiments, the location information of a network device includes one or more GPS coordinates of the network device. In some embodiments, the installer device transmits the MAC address and the serial number of the network device and the customer information from a mobile app installed in the installer device that contains location information of the network device to the device deployment module.

In operation 416, the device deployment module 110 of the cloud server 102 activates each of the network devices 104-1, ..., 104-N of the network 150, for example, based on the device information and the location information received from the installer device. In some embodiments, the device deployment module associates each network device with a database entry of the planned network design 160 in the deployment database 112 of the cloud server without manual input. In some embodiments, the planned network design 160 contains a list of network devices to be deployed at a customer site and detailed information related to the network devices, for example, device name information of the network devices, device type information of the network devices and deployment topology information that defines how network devices are connected to each other. After a network device is associated with a corresponding database entry in the deployment database, the network device is activated. In some embodiments, the device deployment module performs location based service activation of the network devices 104-1, ..., 104-N.

After the activation of a network device 104-1, ..., or 104-N of the network 150, the cloud server 102 (e.g., the device deployment module 110) can detect one or more network deployment deviations in the deployment of the network 150 based on the planned network design 160 and/or the deployment rule set 130. The cloud server 102 (e.g., the device deployment module 110) can, for example, detect location, topology, addition/omission, and/or hardware network deployment deviations in the deployment of the network 150 and notify an installer in real-time such that remedy actions can be taken by the installer to address or resolve the network deployment deviations. For example, an installer may be assigned an installation job using a mobile app at the installer device 106 of the installer. The mobile app at the installer device 106 can guide the installer to bring up every network device into an operational state. As each network device is installed, the status of the network device and any deviations to the planned deployment may be notified to the installer in real-time so remedial action can be taken by the installer.

In operation 418, the cloud server 102 (e.g., the device deployment module) compares a deployed location of a network device 104-1, ..., or 104-N with a planned or suggested location of the network device in the planned network design 160 stored in deployment database 112 to detect a network deployment location deviation. For example, the cloud server 102 (e.g., the device deployment module) detects a network deployment location deviation if the deployed location of a network device 104-1, ..., or 104-N is different from a planned or suggested location of the network device in the planned network design 160 stored in deployment database 112. If no network deployment location deviation is detected, the cloud server (e.g., the device deployment module) takes no action to address network deployment location deviation. If a network deployment location deviation is detected, in operation 420, the cloud server (e.g., the device deployment module) reports the network deployment location deviation to the installer device, e.g., to a mobile application in the installer device. If an installer operating the installer device intentionally makes the network deployment location deviation, the installer may take no action to address network deployment location deviation. Otherwise, in operation 422, an installer operating the installer device addresses the network deployment location deviation by moving a corresponding network device from its deployed location to the planned or suggested location of the corresponding network device in the planned network design 160. For example, a specific network device in the planned network design 160 may have a suggested location, for example, coordinates $(X_1, Y_1)$ in the floor plan. It is possible that due to various reasons, an installer places the specific network device at a different location, for example, coordinates $(X_2, Y_2)$ in the floor plan. When the specific network device is activated, for example, by scanning a QR code on the specific network device using the installer device 106, a mobile app in the installer device 106 sends the new coordinates of the specific network device to the cloud server, which detects a network deployment location deviation and reports the network deployment location deviation to an installer using the installer device 106. If the installer intentionally deviates from the planned network design 160, the installer may notify the cloud server or an operator (e.g., an administrator) at the cloud server via a mobile app in the installer device 106 and the cloud server or an operator (e.g., an administrator) at the cloud server may accept this location deviation. However, if the network deployment location deviation is unintentional, the installer can fix the deviation promptly by, for example, moving the specific network device from the deployed location (e.g., coordinates ($X_2, Y_2$) in the floor plan) to the suggested location in the planned network design 160 (e.g., coordinates ($X_1, Y_1$) in the floor plan).

In operation 424, the cloud server 102 (e.g., the device deployment module) compares a list of deployed device in the network 150 at the customer site 114 with a planned list of network devices to be deployed in the planned network design 160 stored in deployment database 112 to detect a network deployment addition/omission deviation. For example, any addition or deletion of devices from the planned network design is reported as a network deployment addition/omission deviation to a mobile app at the installer device to alert an installer of such deviation. In some embodiments, the cloud server 102 (e.g., the device deployment module) detects a network deployment addition deviation if more than planned number of network devices are deployed in the network at the customer site 114 and/or detects a network deployment omission deviation if less than planned number of network devices are deployed in the network at the customer site 114. If no network deployment addition/omission deviation is detected, the cloud server (e.g., the device deployment module) takes no action to address network deployment addition/omission deviation. If a network deployment addition/omission deviation is detected, in operation 426, the cloud server (e.g., the device deployment module) reports the network deployment addition/omission deviation to the installer device, e.g., to a mobile application in the installer device. In some embodiments, if an installer operating the installer device intentionally makes the network deployment addition/omission deviation, the installer may take no action to address the network deployment addition/omission deviation. Otherwise, in operation 428, an installer operating the installer device addresses the network deployment addition/omission deviation by adding a network device that is included in the planned network design 160 but not included in the list of deployed network device or by removing a network device that is not included in the planned network design 160 but is included in the list of deployed network device.

Network devices may be allowed to connect to each other only on allowed ports. For example, the deployment rule set 130 may contain one or more rules for connecting network devices (e.g., the network devices 104-1, . . . , 104-N) to each other. Once a network device is connected and is operational, the network device informs the cloud server 102 (e.g., the device deployment module 110) about its connectivity details (e.g., port number and neighbor(s)), for example, via link layer discovery protocol (LLDP) metrics. For example, a network device may report network connectivity information to the cloud server 102 (e.g., the device deployment module 110) in operation 430. In operation 432, the cloud server 102 (e.g., the device deployment module 110) determines a network deployment topology deviation based on the deployment rule set 130 and the received network connectivity information. For example, the cloud server 102 (e.g., the device deployment module 110) may check the LLDP metrics against a rule engine and report any topology deviations to a mobile app in the installer device 106. In another example, the cloud server 102 (e.g., the device deployment module) detects a network deployment topology deviation if the network connectivity information of a network device is different from a planned connectivity configuration of the network device in the planned network design 160 stored in deployment database 112. If no network deployment topology deviation is detected, the cloud server (e.g., the device deployment module) takes no action to address network deployment topology deviation. If a network deployment topology deviation is detected, in operation 434, the cloud server (e.g., the device deployment module) reports the network deployment topology deviation to the installer device, e.g., to a mobile application in the installer device. In some embodiments, if an installer operating the installer device intentionally makes the network deployment topology deviation, the installer may take no action to address network deployment topology deviation. Otherwise, in operation 436, an installer operating the installer device addresses the network deployment topology deviation by changing network connectivity of a corresponding network device (e.g., connected port number of a corresponding network device or connecting the corresponding network device to a different neighbor network device.)

Once a network device goes into an operational state, any power supply or fan failures can be reported to the cloud server 102 (e.g., the device deployment module 110) as hardware deviations and reports to an installer, for example, on a mobile app in the installer device 106 of the installer. The installer can address hardware deviations if spare components are available on site (e.g., at the customer site 114). If spare components are not available on site to address the hardware deviations, the Installer can "force close" the installation job and notify the cloud server or an operator (e.g., an administrator) at the cloud server the reason. The cloud server or an operator (e.g., an administrator) at the cloud server may create a repair and replacement job, which can be assigned to a technician after spare components are received at the customer site 114. For example, a network device may report power supply or fan failure information to the cloud server 102 (e.g., the device deployment module 110) in operation 438. In operation 440, in response to the power supply or fan failure information, the cloud server 102 (e.g., the device deployment module 110) reports a network deployment hardware deviation to the installer device, e.g., to a mobile application in the installer device. In operation 442, an installer operating the installer device addresses the network deployment hardware deviation by replacing one or more network device components of a corresponding network device.

Figure 7A:
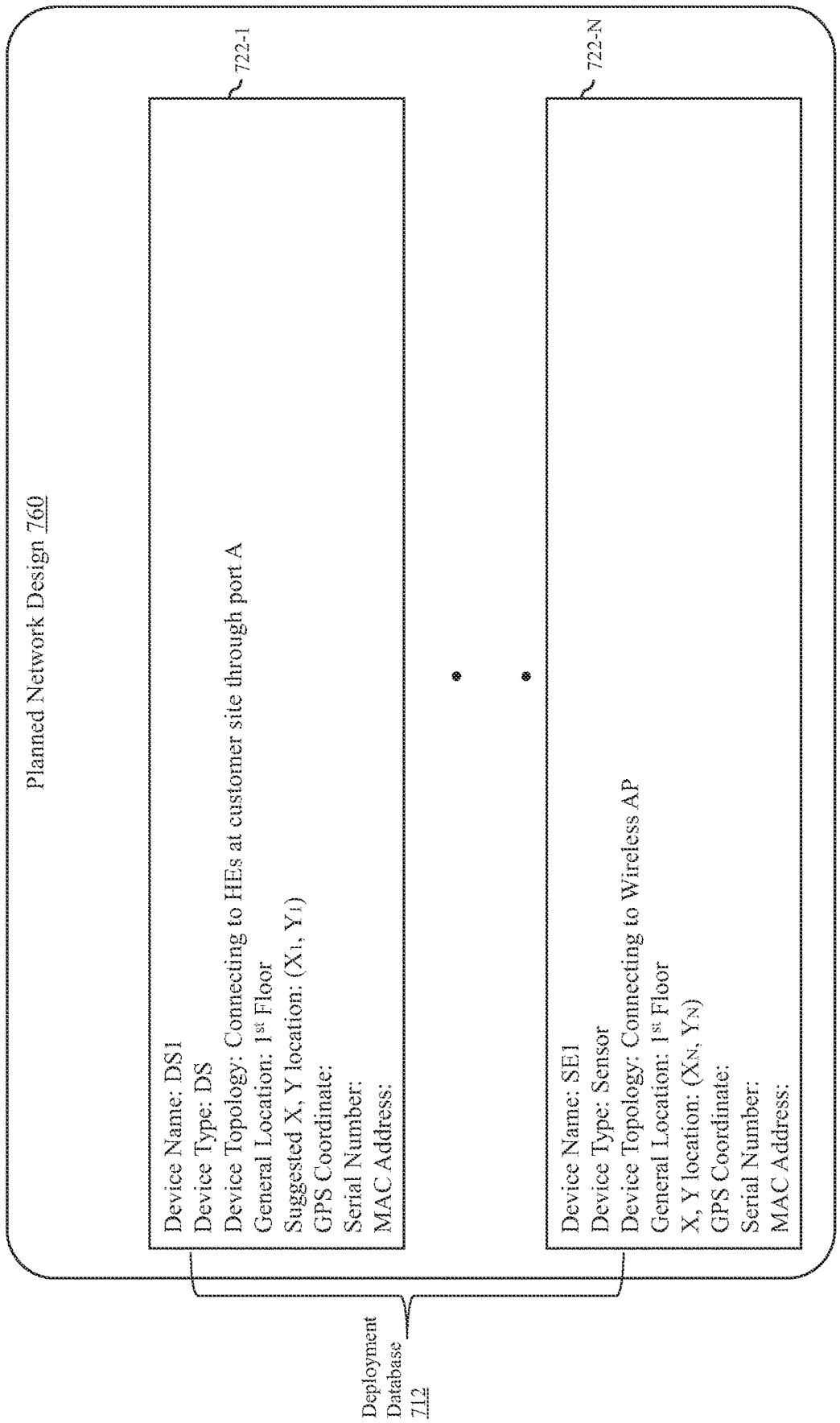
FIG. 7A depicts an embodiment of a deployment database having the planned network design that contains information regarding network devices to be deployed at a customer site.

FIG. 7A depicts an embodiment of the deployment database 112 having the planned network design 160 that contains information regarding network devices to be deployed at the customer site 114. In the embodiment depicted in FIG. 7A, a deployment database 712 includes a planned network design 760, which contains multiple database entries, 722-1, . . . , 722-N, where N is an integer greater than 1. Each of the database entries, 722-1, . . . , 722-N, includes device name information of a network device to be deployed at a customer site, device type information of the network device, deployment topology information of the network device, and suggested location information (e.g., coordinates on a floor plan) of the network device. For example, the database entry 722-1 includes device name information (DS.) of a network device to be deployed at a customer site, device type information (e.g., Distribution Switch (DS)) of the network device, deployment topology information (e.g., connecting to head ends (HEs) at the customer site through port A) of the network device, location information (first floor of the customer site), suggested or planned X, Y location (e.g., $(X_1, Y_1)$), and blank GPS coordinate, serial number, and MAC address tags of the network device. The database entry 722-N includes device name information (SE1) of a network device to be deployed at a customer site, device type information (e.g., Sensor (SE)) of the network device, deployment topology information (e.g., connecting to a wireless AP at the customer site) of the network device, general location information (first floor of the customer site), suggested or planned X, Y location (e.g., $(X_N, Y_N)$), and blank GPS coordinate, serial number, and MAC address tags. The deployment database 712 depicted in FIG. 7 is an embodiment of the deployment database 712 depicted in FIG. 1. However, the deployment database 112 depicted in FIG. 1 is not limited to the embodiment shown in FIG. 7A. The planned network design 760 depicted in FIG. 7A is an embodiment of the planned network design 160 depicted in FIG. 1. However, the planned network design 160 depicted in FIG. 1 is not limited to the embodiment shown in FIG. 7.

Figure 7B:
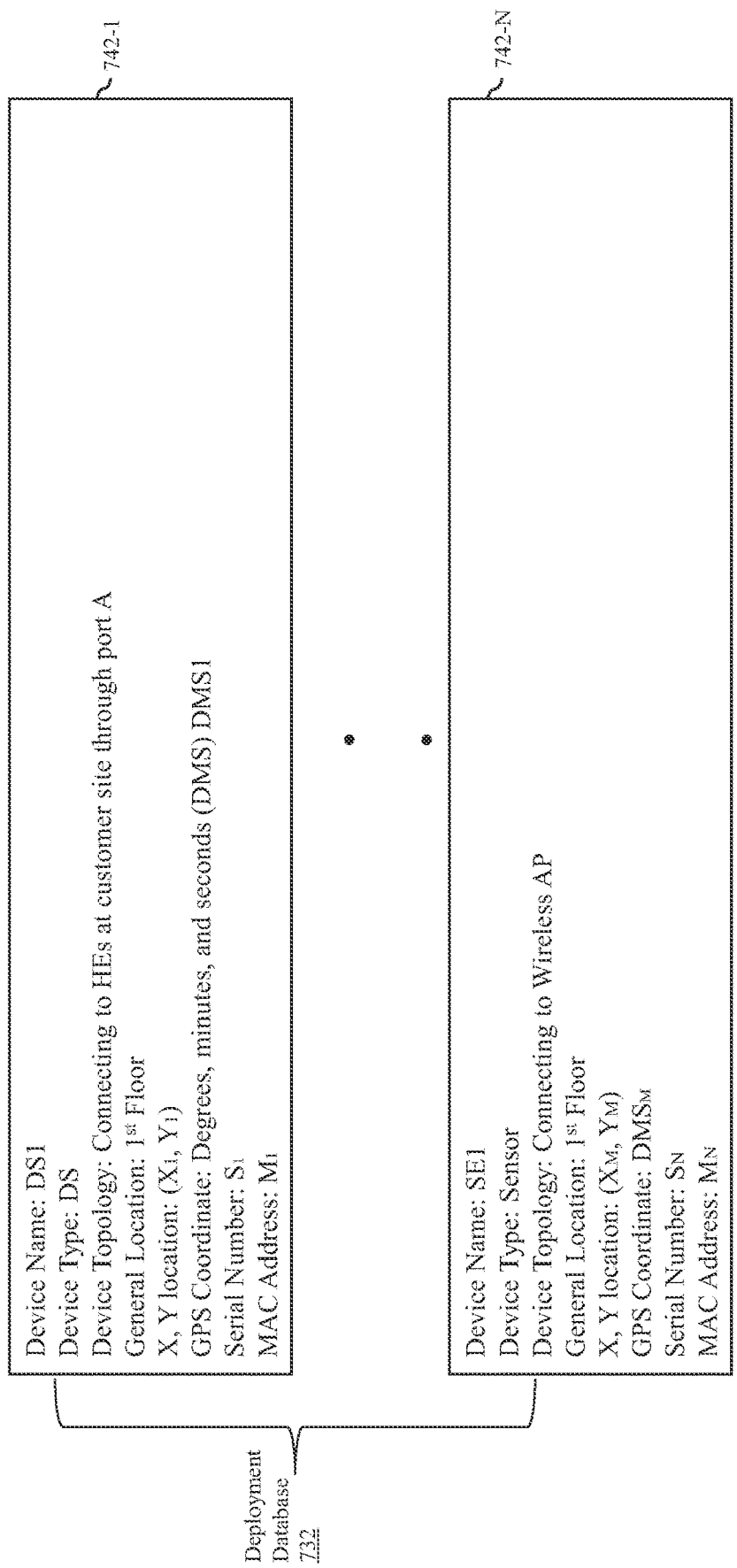
FIG. 7B depicts an embodiment of a deployment database with deployed device information.

FIG. 7B depicts an embodiment of a deployment database 732 with deployed device information of the communications system 100 depicted in FIG. 1. In the embodiment depicted in FIG. 7B, the deployment database 732 includes multiple database entries, 742-1, ..., 742-N, where N is an integer greater than 1. Each of the database entries, 742-1, ..., 742-N, includes device name information of a deployed network device at a customer site, device type information of the deployed network device, deployment topology information of the deployed network device, general location information (e.g., floor information) of the deployed network device, X, Y location information of the deployed network device, the GPS coordinate of the deployed network device, the serial number of the deployed network device, and the MAC address of the deployed network device. The deployment database 732 may be generated based from the deployment database 712, for example, by expanding the deployment database 712 to include the actual installed location information of a deployed network device and/or device specific information of a deployed network device. In some embodiments, based on scanning of network devices during installation, the network device deployment module obtains device specific information (e.g., serial numbers and/or MAC addresses of the network devices and location information of the network devices) of network devices that are being installed and, subsequently, dynamically associate the location information of the network devices that are being installed with the network specific information of the network devices that are being installed. For example, the database entry 742-1 includes device name information (DS1) of a deployed network device at the customer site 114, device type information (e.g., DS) of the deployed network device, deployment topology information (e.g., connecting to HEs through port A) of the deployed network device, general location information (first floor of the customer site) of the deployed network device, the X, Y location (e.g., $(X_1, Y_1)$) of the deployed network device, the GPS coordinate (e.g., degrees, minutes, and seconds (DMS) $DMS_1$) of the deployed network device, the serial number (e.g., $S_1$) of the deployed network device, and the MAC address (e.g., $M_1$) of the deployed network device. If the information (e.g., location and/or topology information) of the deployed device DS1 is different from information (e.g., location and/or topology information) in the planned network design 160 of the deployed device DS1 stored at the deployment database 712 shown in FIG. 7A, the cloud server 102 (e.g., the device deployment module 110) can alert the an installer operating the installer device 106 of such deviations in real-time such that remedial actions can be taken by the installer. The database entry 742-N includes device name information SE1 of a deployed network device at the customer site, device type information (e.g., Sensor (SE)) of the deployed network device, deployment topology information (e.g., connecting to a wireless AP) of the deployed network device, general location information (first floor of the customer site) of the deployed network device, the X, Y location (e.g., $(X_M, Y_M)$) of the deployed network device, the GPS coordinate (e.g., degrees, minutes, and seconds (DMS) $DMS_N$) of the deployed network device, the serial number (e.g., $S_N$) of the deployed network device, and the MAC address (e.g., $M_N$) of the deployed network device. The location coordinates $(X_M, Y_M)$ of the deployed sensor SE1 is different from the planned or suggested location coordinates $(X_N, Y_N)$ of the sensor SE1. For example, an installer operating the installer device 106 intentionally installs the sensor SE1 at location coordinates $(X_M, Y_M)$ instead of suggested location coordinates $(X_N, Y_N)$, to better monitor network conditions. The cloud server 102 (e.g., the device deployment module 110) may alert the of such deviations in real-time and the installer may dismiss such alert and inform the cloud server or an operator (e.g., an administrator) at the cloud server his/her intention. The deployment database 732 depicted in FIG. 7B may be an embodiment of the deployment database 112 depicted in FIG. 1. However, the deployment database 112 depicted in FIG. 1 is not limited to the embodiment shown in FIG. 7B.

Figure 8:
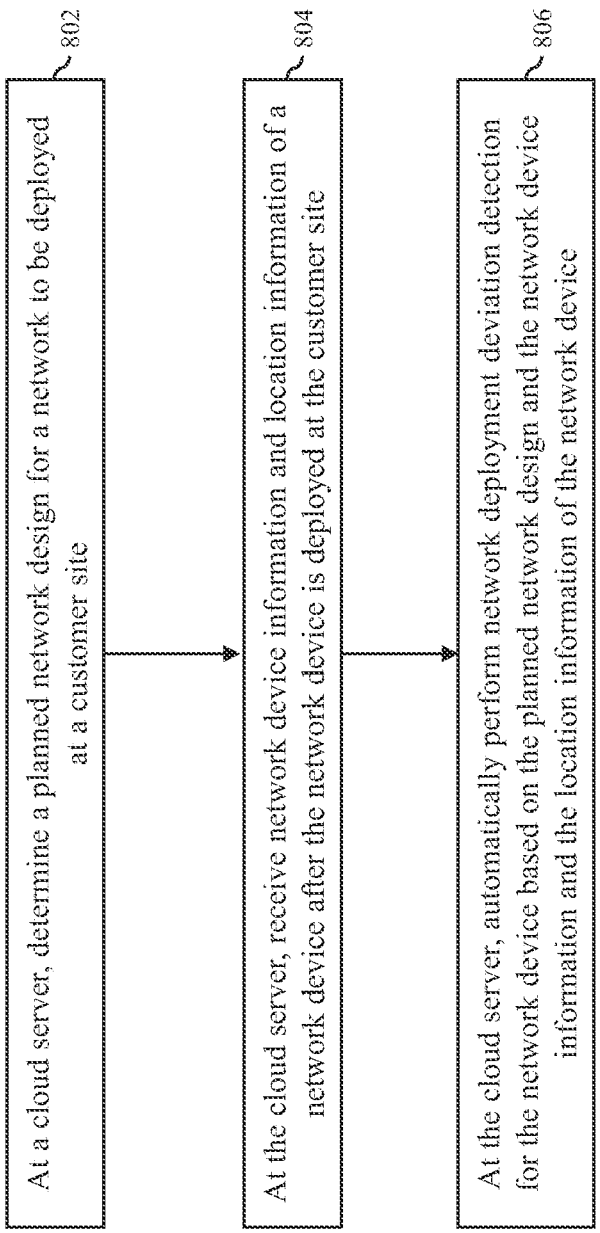
FIG. 8 is a process flow diagram of a method of network deployment in accordance to an embodiment of the invention.

FIG. 8 is a process flow diagram of a method of network deployment in accordance to an embodiment of the invention. According to the method, at block 802, at a cloud server, a planned network design for a network to be deployed at a customer site is determined. At block 804, at the cloud server, network device information and location information of a network device is received after the network device is deployed at the customer site. At block 806, at the cloud server, network deployment deviation detection for the network device is automatically performed based on the planned network design and the network device information and the location information of the network device. In some embodiments, from the cloud server, a network deployment deviation associated with the network device is reported to an operator when the network deployment deviation associated with the network device is detected at the cloud server. In some embodiments, at the cloud server, a network deployment location deviation associated with the network device is detected based on a planned location of the network device at the customer site in the planned network design and the location information of the network device. In some embodiments, the location information of the network device includes a deployed location of the network device at the customer site. In some embodiments, at the cloud server, the network deployment location deviation associated with the network device is detected when the planned location of the network device at the customer site in the planned network design is different from the deployed location of the network device at the customer site. In some embodiments, from the cloud server, the network deployment location deviation associated with the network device is reported to an operator when the network deployment location deviation associated with the network device is detected at the cloud server. In some embodiments, at the cloud server, a network deployment topology deviation associated with the network device is detected based on a deployment rule set and connectivity information of the network device. In some embodiments, from the cloud server, the network deployment topology deviation associated with the network device is reported to an operator when the network deployment topology deviation associated with the network device is detected at the cloud server. In some embodiments, from the cloud server, a network deployment addition or omission deviation is reported to an operator when a network element that is not listed in the planned network design is detected by the cloud server as being deployed at the customer site. In some embodiments, at the cloud server, hardware failure information of the network device is received from the network device. In some embodiments, from the cloud server, a network deployment hardware deviation associated with the network device is reported to an operator in response to the hardware failure information of the network device. The operations 802, 804, 806 in the flow diagram of FIG. 8 may correspond to the operations 404, 414, 418, 424 in the swim-lane diagram of FIG. 4. The cloud server may be similar to, the same as, or a component of the cloud server 102 depicted in FIG. 1. The network device may be similar to, the same as, or a component of the network devices 104-1, . . . , 104-N depicted in FIG. 1. The customer site may be similar to, the same as, or a component of the customer site 114 depicted in FIG. 1.

Figure 9:
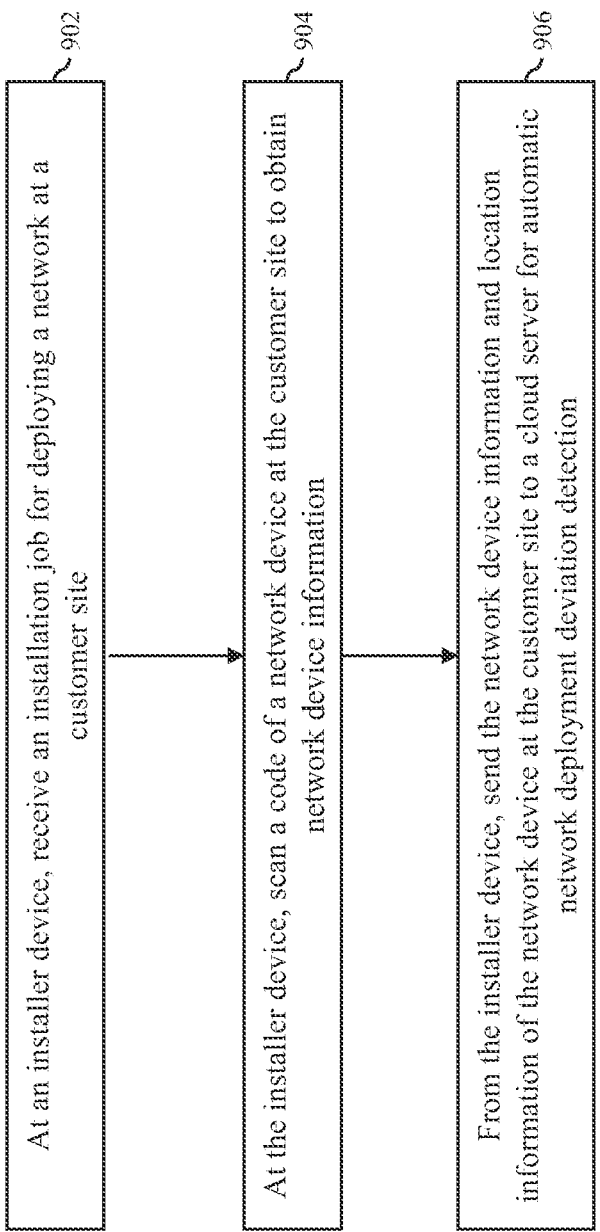
FIG. 9 is a process flow diagram of a method of network deployment in accordance to an embodiment of the invention.

FIG. 9 is a process flow diagram of a method of network deployment in accordance to an embodiment of the invention. According to the method, at block 902, at an installer device, an installation job for deploying a network at a customer site is received. At block 904, at the installer device, a code of a network device is scanned at the customer site to obtain network device information. At block 906, from the installer device, the network device information and location information of the network device at the customer site is sent to a cloud server for automatic network deployment deviation detection. In some embodiments, at the installer device, a report of a network deployment deviation associated with the network device is received from the cloud server, and, at the installer device, whether an installer operating the installer device intentionally makes the network deployment deviation associated with the network device is determined. In some embodiments, the network deployment deviation associated with the network device is addressed when the installer operating the installer device does not intentionally make the network deployment deviation associated with the network device. In some embodiments, the network deployment deviation associated with the network device includes a network deployment location deviation associated with the network device, and the network device is moved from a deployed location of the network device at the customer site to a planned location of the network device at the customer site. In some embodiments, the network deployment deviation associated with the network device includes a network deployment topology deviation associated with the network device, and network connectivity of the network device is changed based on a planned network design at the customer site. In some embodiments, at the installer device, a report of a network deployment addition or omission deviation is received from the cloud server, and the network deployment addition or omission deviation is addressed by removing or adding at least network device at the customer site based on a planned network design at the customer site. In some embodiments, at the installer device, a report of a network deployment hardware deviation associated with the network device is received from the cloud server, and, the network deployment hardware deviation is addressed by replacing at least one component of the network device. The operations 902, 904, 906 in the flow diagram of FIG. 9 may correspond to the operations 408, 410, 414 in the swim-lane diagram of FIG. 4. The installer device may be similar to, the same as, or a component of the installer device 106 depicted in FIG. 1. The cloud server may be similar to, the same as, or a component of the cloud server 102 depicted in FIG. 1. The network device may be similar to, the same as, or a component of the network devices 104-1, . . . , 104-N depicted in FIG. 1. The customer site may be similar to, the same as, or a component of the customer site 114 depicted in FIG. 1.

Figure 10:
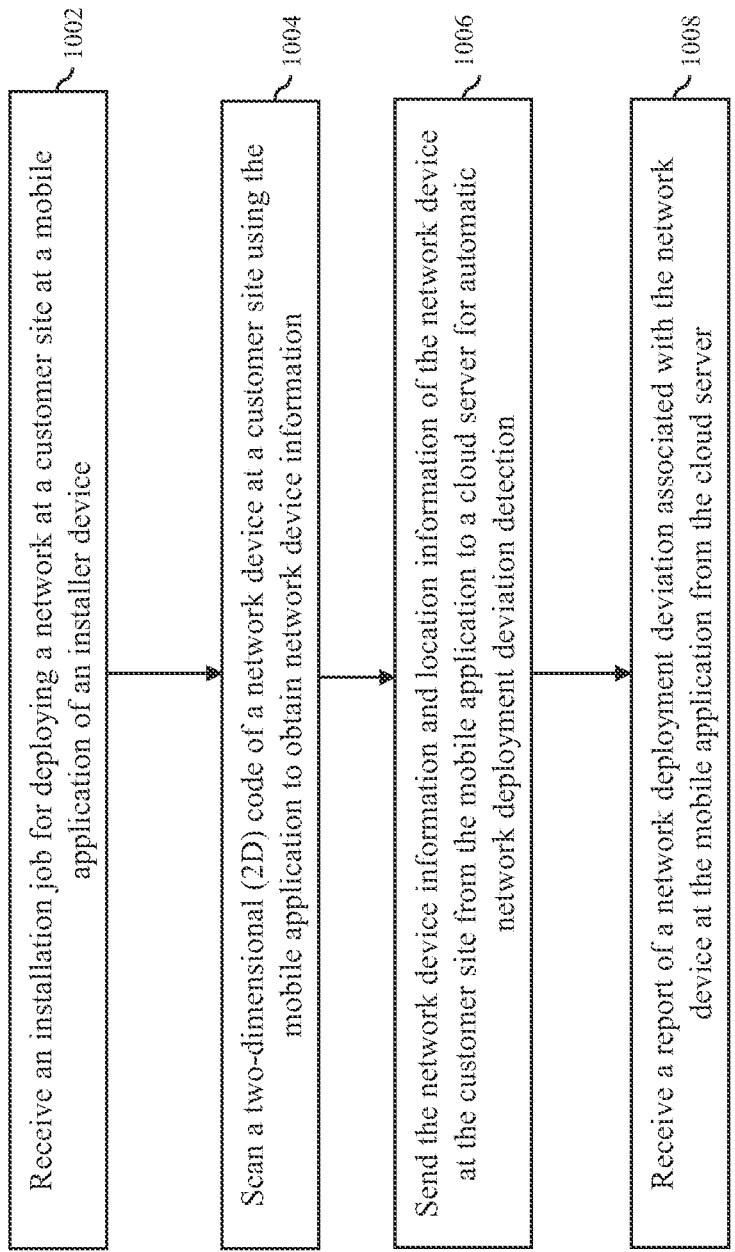
FIG. 10 is a process flow diagram of a method of network deployment in accordance to an embodiment of the invention.

FIG. 10 is a process flow diagram of a method of network deployment in accordance to an embodiment of the invention. According to the method, at block 1002, an installation job for deploying a network at a customer site is received at a mobile application of an installer device. At block 1004, a two-dimensional (2D) code of a network device is scanned at a customer site using the mobile application to obtain network device information. At block 1006, the network device information and location information of the network device at the customer site is sent from the mobile application to a cloud server for automatic network deployment deviation detection. At block 1008, a report of a network deployment deviation associated with the network device is received at the mobile application from the cloud server. In some embodiments, in the mobile application, an interface querying an installer operating the installer device whether or not the installer intentionally makes the network deployment deviation associated with the network device is presented. The operations 1002, 1004, 1006, 1008 in the flow diagram of FIG. 10 may correspond to the operations 408, 410, 414, 420, 426, 434, 440 in the swim-lane diagram of FIG. 4. The installer device may be similar to, the same as, or a component of the installer device 106 depicted in FIG. 1. The cloud server may be similar to, the same as, or a component of the cloud server 102 depicted in FIG. 1. The network device may be similar to, the same as, or a component of the network devices 104-1, . . . , 104-N depicted in FIG. 1. The customer site may be similar to, the same as, or a component of the customer site 114 depicted in FIG. 1.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method of network deployment, the method comprising:
    at a cloud server, determining a planned network design for a network to be deployed at a customer site;
    at the cloud server, receiving network device information and location information of a network device after the network device is deployed at the customer site;
    at an installer device, receiving an installation job for deploying a network at a customer site; at the installer device, scanning a code of a network device at the customer site to obtain network device information; and
    at the cloud server, automatically performing network deployment deviation detection, which includes network deployment location deviation detection and, network deployment topology deviation detection, network deployment addition or omission deviation detection, and network deployment hardware deviation detection, for the network device based on the planned network design and the network device information and the location information of the network device; and
    from the cloud server, reporting a network deployment location deviation, a network deployment topology deviation, a network deployment addition or omission deviation, or a network deployment hardware deviation to an operator when the network deployment location deviation, the network deployment topology deviation, the network deployment addition or omission deviation, or the network deployment hardware deviation is detected at the cloud server.

2. The method of claim 1, further comprising from the cloud server, reporting a network deployment deviation associated with the network device to an operator when the network deployment deviation associated with the network device is detected at the cloud server.

3. The method of claim 1, wherein at the cloud server, automatically performing network deployment deviation detection for the network device based on the planned network design and the network device information and the location information of the network device comprises at the cloud server, detecting a network deployment location deviation associated with the network device based on a planned location of the network device at the customer site in the planned network design and the location information of the network device.

4. The method of claim 3, wherein the location information of the network device comprises a deployed location of the network device at the customer site.

5. The method of claim 4, wherein at the cloud server, detecting the network deployment location deviation associated with the network device based on the planned location of the network device at the customer site in the planned network design and the location information of the network device comprises at the cloud server, detecting the network deployment location deviation associated with the network device when the planned location of the network device at the customer site in the planned network design is different from the deployed location of the network device at the customer site.

6. The method of claim 5, further comprising from the cloud server, reporting the network deployment location deviation associated with the network device to an operator when the network deployment location deviation associated with the network device is detected at the cloud server.

7. The method of claim 1, wherein at the cloud server, automatically performing network deployment deviation detection for the network device based on the planned network design and the network device information and the location information of the network device comprises at the cloud server, detecting a network deployment topology deviation associated with the network device based on a deployment rule set and connectivity information of the network device.

8. The method of claim 7, further comprising from the cloud server, reporting the network deployment topology deviation associated with the network device to an operator when the network deployment topology deviation associated with the network device is detected at the cloud server.

9. The method of claim 1, further comprising from the cloud server, reporting a network deployment addition or omission deviation to an operator when a network element that is not listed in the planned network design is detected by the cloud server as being deployed at the customer site.

10. The method of claim 1, further comprising at the cloud server, receiving hardware failure information of the network device from the network device.

11. The method of claim 10, further comprising from the cloud server, reporting a network deployment hardware deviation associated with the network device to an operator in response to the hardware failure information of the network device.

12. A method of network deployment, the method comprising:
    at an installer device, receiving an installation job for deploying a network at a customer site; at the installer device, scanning a code of a network device at the customer site to obtain network device information; and
    at a cloud server, determining a planned network design for a network to be deployed at a customer site;
    at the cloud server, receiving network device information and location information of a network device after the network device is deployed at the customer site; and
    from the installer device, sending the network device information and location information of the network device at the customer site to a cloud server for automatic network deployment deviation detection, which includes network deployment location deviation detection and, network deployment topology deviation detection, network deployment addition or omission deviation detection, and network deployment hardware deviation detection;
    from the cloud server, reporting a network deployment location deviation, a network deployment topology deviation, a network deployment addition or omission deviation, or a network deployment hardware deviation to an operator when the network deployment location deviation, the network deployment topology deviation, the network deployment addition or omission deviation, or the network deployment hardware deviation is detected at the cloud server.

13. The method of claim 12, further comprising:
at the installer device, receiving a report of a network deployment deviation associated with the network device from the cloud server; and
at the installer device, determining whether an installer operating the installer device intentionally makes the network deployment deviation associated with the network device.

14. The method of claim 13, further comprising:
addressing the network deployment deviation associated with the network device when the installer operating the installer device does not intentionally make the network deployment deviation associated with the network device.

15. The method of claim 14, wherein the network deployment deviation associated with the network device comprises a network deployment location deviation associated with the network device, and wherein addressing the network deployment deviation associated with the network device when the installer operating the installer device does not intentionally make the network deployment deviation associated with the network device comprises moving the network device from a deployed location of the network device at the customer site to a planned location of the network device at the customer site.

16. The method of claim 14, wherein the network deployment deviation associated with the network device comprises a network deployment topology deviation associated with the network device, and wherein addressing the network deployment deviation associated with the network device when the installer operating the installer device does not intentionally make the network deployment deviation associated with the network device comprises changing network connectivity of the network device based on a planned network design at the customer site.

17. The method of claim 12, further comprising:
at the installer device, receiving a report of a network deployment addition or omission deviation from the cloud server; and
addressing the network deployment addition or omission deviation by removing or adding at least network device at the customer site based on a planned network design at the customer site.

18. The method of claim 12, further comprising:
at the installer device, receiving a report of a network deployment hardware deviation associated with the network device from the cloud server; and
addressing the network deployment hardware deviation by replacing at least one component of the network device.

19. A method of network deployment, the method comprising:
at a cloud server, determining a planned network design for a network to be deployed at a customer site;
at the cloud server, receiving network device information and location information of a network device after the network device is deployed at the customer site;
at an installer device, receiving an installation job for deploying a network at a customer site;
at the installer device, scanning a code of a network device at the customer site to obtain network device information; and
at the cloud server, automatically performing network deployment deviation detection, which includes network deployment location deviation detection, network deployment topology deviation detection, network deployment addition or omission deviation detection, and network deployment hardware deviation detection, for the network device based on the planned network design and the network device information and the location information of the network device; and
from the cloud server, reporting a network deployment location deviation, a network deployment topology deviation, a network deployment addition or omission deviation, or a network deployment hardware deviation to an operator when the network deployment location deviation, the network deployment topology deviation, the network deployment addition or omission deviation, or the network deployment hardware deviation is detected at the cloud server.

\* \* \* \* \*